US012592828B2

(12) United States Patent
Osborn et al.

(10) Patent No.: US 12,592,828 B2
(45) Date of Patent: Mar. 31, 2026

(54) SYSTEM AND METHOD FOR PARALLEL MANUFACTURE AND VERIFICATION OF ONE-TIME-PASSWORD AUTHENTICATION CARDS

(71) Applicant: Capital One Services, LLC, McLean, VA (US)

(72) Inventors: Kevin Osborn, Newton Highlands, MA (US); Srinivasa Chigurupati, Long Grove, IL (US)

(73) Assignee: Capital One Services, LLC, McLean, VA (US)

( * ) Notice: Subject to any disclaimer, the term of this patent is extended or adjusted under 35 U.S.C. 154(b) by 175 days.

(21) Appl. No.: 18/094,238

(22) Filed: Jan. 6, 2023

(65) Prior Publication Data

US 2024/0235841 A1     Jul. 11, 2024

(51) Int. Cl.
| | |
|---|---|
| *H04L 9/32* | (2006.01) |
| *H04L 9/08* | (2006.01) |
| *H04L 9/14* | (2006.01) |

(52) U.S. Cl.
CPC ............ *H04L 9/3234* (2013.01); *H04L 9/085* (2013.01); *H04L 9/14* (2013.01); *H04L 9/3228* (2013.01); *H04L 9/3242* (2013.01)

(58) Field of Classification Search
CPC ......... H04L 9/14; H04L 9/3242; H04L 9/085; H04L 9/3234; H04L 9/3228
See application file for complete search history.

(56) References Cited

U.S. PATENT DOCUMENTS

| | | | |
|---|---|---|---|
| 4,683,553 A | 7/1987 | Mollier |
| 4,827,113 A | 5/1989 | Rikuna |
| 4,910,773 A | 3/1990 | Hazard et al. |
| (Continued) | | | |

FOREIGN PATENT DOCUMENTS

| | | |
|---|---|---|
| CA | 3010336 | 7/2017 |
| CN | 101192295 | 6/2008 |
| (Continued) | | |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Han Yang
(74) *Attorney, Agent, or Firm* — KDW Firm PLLC; Andrew D. Kasnevich

(57)     ABSTRACT
The disclosed system and method are directed to a novel implementation of encryption service provision which obviates a need for network communication between a card manufacturing/personalization entity and a validation entity during the card personalization phase. The proposed solution decouples the operation flow associated with personalization of an OTP card (as carried out by a manufacturing HSM) and the validation of an OTP card cryptogram (as carried out by a distinct validation HSM). This is accomplished by the generation and distribution of a third master key which enables the personalization and the validation HSMs to independently derive the shared secret value used in generation and validation of a transaction cryptogram associated with an OTP card operation.

20 Claims, 8 Drawing Sheets

(56)                    References Cited

U.S. PATENT DOCUMENTS

| | | | |
|---|---|---|---|
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B2 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |

(56)     References Cited

U.S. PATENT DOCUMENTS

| | | | |
|---|---|---|---|
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B2 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,218,307 B1 | 1/2022 | Griffin et al. |
| 11,297,958 B2 | 4/2022 | Vukich |
| 11,334,872 B2 | 5/2022 | Phillips |

(56) References Cited

U.S. PATENT DOCUMENTS

| | | | |
|---|---|---|---|
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHUGH |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |

(56)  References Cited

U.S. PATENT DOCUMENTS

| | | |
|---|---|---|
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0040628 A1 | 2/2014 | Fort et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0189359 A1 * | 7/2014 | Marien .................. H04L 9/3228 713/172 |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0142666 A1 | 5/2015 | Landrok et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0278804 A1 * | 10/2015 | Jenks .................. G06Q 20/3674 705/67 |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |

(56)                 References Cited

U.S. PATENT DOCUMENTS

| 2017/0230189 A1 | 8/2017 | Toll et al. | |
|---|---|---|---|
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0364911 A1 | 12/2017 | Landrok et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0106613 A1* | 4/2020 | Newman | H04W 12/06 |
| 2021/0004806 A1 | 1/2021 | Noe | |
| 2021/0258162 A1* | 8/2021 | Le Saint | H04L 9/321 |
| 2021/0272098 A1 | 9/2021 | Delsuc | |
| 2021/0304189 A1 | 9/2021 | Gupta | |
| 2021/0326866 A1* | 10/2021 | Hurry | G06Q 20/382 |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0407712 A1 | 12/2022 | Osborn et al. | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| CN | 103023643 | 4/2013 |
|---|---|---|
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 9910824 A1 | 3/1999 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | 2017182411 A1 | 10/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25,

(56)                 References Cited

OTHER PUBLICATIONS

2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared- : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card User Authentication for Contactless Smart Cards based on Gesture Recognition", LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

The International Search Report and Written Opinion mailed Apr. 24, 2024, for related Int. App. No. PCT/US2024/010440 (17 pages).

Author Unknown, "Global expansion of card tapping mobile OTP for security and convenience is imminent," Jun. 28, 2022, website: https://www.swidch.com/blogs/card-tapping-motp-blog.

Emvco, "EMV Card Personalisation Specification," Aug. 1, 2021, pp. 1-114, Retrieved from the Internet URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

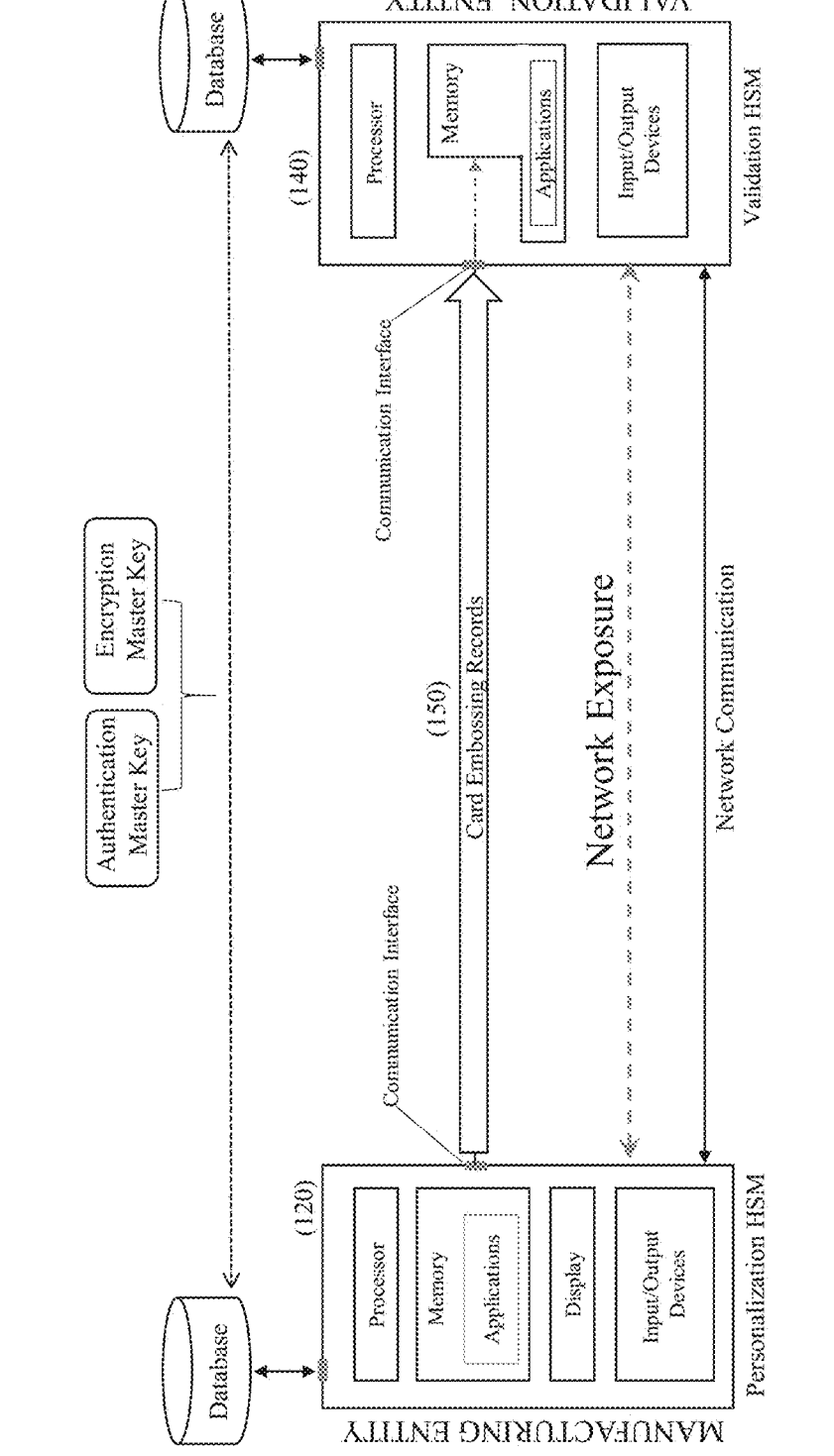
FIG. 1 (Conventional)

OTP Card Operation at Run-time — Generation of the Cryptogram

800

SYSTEM AND METHOD FOR PARALLEL MANUFACTURE AND VERIFICATION OF ONE-TIME-PASSWORD AUTHENTICATION CARDS

FIELD OF THE DISCLOSURE

The present disclosure relates to systems and methods for streamlining provision of encryption services, and more specifically to systems and methods for enabling parallel personalization and validation of one-time-password authentication cards.

BACKGROUND

Creating cards with cryptographic keys requires certain card-specific encryption parameter, such as the shared secret value, to be shared between a card personalization and/or manufacturing entity and a validation partner, to thereby enable the verification partner to decrypt and validate an encrypted message generated and transmitted by the card at run time. This is usually handled by pushing embossing records generate during a personalization phase of the card, to a validating hardware security module (HSM). In some cases, however, the validating partner may be separate and distinct from the manufacturing and/or personalization entity. The only choice then is to communicate card personalization records to a validation entity during a personalization phase of the card, thus risking network exposure of critical encryption parameters.

These and other deficiencies exist. Accordingly, there is a need for systems and methods for enabling parallelized personalization and validation processes associated with the operation of one-time-password authentication cards.

SUMMARY OF THE DISCLOSURE

One aspect of the present disclosure is directed to an automated process for parallelized encryption and personalization at a card manufacturer HSM and decryption and validation at an independent (possibly remotely located) card validator HSM. The process may be initiated via a set of operation conducted by an encryption service provider to enable independent generation of cryptographic parameters, such as a shared secret value, by a validation HSM. Accordingly, a validation HSM may perform decryption and validation of a transaction cryptogram, associated with the operation of a one-time-password (OTP) authentication cards, without access to or communication with a card manufacturing HSM.

Accordingly, a security feature associated with the aforementioned systems and processes involves exclusion of network transmissions associated with sensitive (decryption-related data) between the personalization and validation HSMs. For the purpose of the present disclosure, manufacturing entity and personalization entity are used interchangeably.

Accordingly some embodiments are directed to a method for parallelizing generation and validation processes associated with a one-time password (OTP) cryptogram generated by an OTP authentication card, the method comprising: distributing, via secure communication from an encryption service provider, a shared-secret master key to a personalization hardware security module (HSM) associated with a manufacturing entity and a validation HSM associated with a validating entity, wherein the manufacturing HSM and validation HSM are distinct and separately store a first master key (MK1), for generation of a message authentication code (MAC), and a second master key (MK2), for encrypting a concatenation of the MAC and a data payload. The method may further comprise generating, by the personalization HSM, a unique secret identifier by encrypting a globally unique card identifier (UID), associated with an OTP card, with the shared-secret master key.

The unique secret identifier may then be stored in an embossing file on the OTP card during a personalization phase, wherein the embossing file may further comprise a first unique key (UDK1) derived by encrypting the globally unique card identifier (UID) with the first master key, and a second unique key (UDK2) derived by encrypting the globally unique card identifier (UID) with the second master key. In some embodiments the Shared Secret (SS) master key, corresponding, for example, to the third master key may be distributed to the personalization and the validation HSMs as an encryption function.

A cryptogram transmission message may then be generated by the OTP authentication card (interchangeably referred to as the contactless card) and transmitted to the validation HSM at run time (corresponding to initiation of an authentication transaction using the OTP card.) The validation HSM, being in possession of the first, second and the shared-secret master keys, may then receive the cryptogram transmission message generated by the OTP card (during run time or active operation of the OTP card) and validate a transaction cryptogram included therein without any prior communication with the personalization HSM. The cryptogram transmission message may comprise the transaction cryptogram, the unique secret identifier (e.g., the shared secret value independently generated by the personalization and the validation HSM using the shared-secret master key) and the globally unique card identifier (UID). The cryptogram transmission message may further include run time generated data, such as a transaction counter value, which may be updated for each authentication transaction facilitated by the OTP card. The unique secret identifier, in addition to the UID and the transaction counter value, may then be used to facilitate the decryption of the transaction cryptogram and validation of the MAC using one or more of the master keys stored on the validation HSM. For example, the unique secret identifier (e.g., the SS value) generated by the personalization HSM, and stored on the OTP card, may be independently derived by the validation entity, using the SS master key, and verified against the SS value transmitted by the OTP card. The encryption process for generating the unique secret identifier may corresponds to a (crypto-graphic) combination of the globally unique card identifier (UID) with the SS master key using a diversification function.

In some embodiments, the MAC may be generated by combining the first unique key (UDK1), the unique secret identifier (e.g., shared secret value) and the transaction counter value, using a diversification function, wherein the diversification function corresponds to an exclusive OR (XOR) logical operation. The MAC may then be concatenated with a transmission (data) payload and the resulting data packet encrypted with the second unique key (UDK2) and the transaction counter value to generate the transaction cryptogram (e.g., OTP cryptogram). The transaction cryptogram may then be included in a cryptogram transmission message, along with the SS value and the UID, and transmitted to the validation HSM.

In some embodiments the cryptogram transmission message may further comprise information associated with a routing code to identify the validation HSM and a set of key identifiers as references to the first, second and SS master keys.

In accordance to some embodiments of the present disclosure, the SS master key may be stored onto the contactless card and used, by an applet running on the contactless card, to derive the unique secret identifier (e.g., SS value) at run time. This may be accomplished by encrypting the globally unique card identifier (UID) with the SS master key.

In some embodiments, the SS master key, distributed by the encryption service provider, may be stored by the validation entity, in conjunction with one or more mapping records for matching the globally unique card identifier (UID) with a corresponding user account. The UID may be provided to a validation HSM as part of the cryptogram transmission message generated by the OTP card.

The unique secret identifier may then be (independently) derived by the validation HSM, by combining the first master key with the UID, during authentication of a MAC associated with the OTP transaction cryptogram. Once the MAC is authenticated and the transaction cryptogram is validated, a verification response message may be transmitted back to a requesting entity, by the validation HSM and/or a verification server associated with the validation entity.

One iteration of the present disclosure may involve the transmission of the unique secret identifier, instead of the UID, in the cryptogram transmission message. In such a scenario, the UID may be derived by the validation HSM by decrypting the unique secret identifier with the SS master key previously stored on the validation HSM. The decryption process may involve combining the SS master key with the unique secret identifier using a diversification function.

Some embodiments of the present disclosure are directed to a system for secure provision of encryption service for processing of OTP card transactions, the system comprising a computer hardware arrangement configure to: generate, by a central key processing device, a shared-secret (SS) master key, in addition to an authentication and an encryption master keys, wherein the SS master key is used to generate a unique secret identifier. The system may be further configured to distribute, by the central key processing device, the shared-secret master key, along with an authentication and an encryption master keys, to a personalization hardware security module (HSM) associated with a card manufacturing entity, and a validation HSM associated with a validation entity. This enables independent derivation of the unique secret identifier (e.g., the SS value) by the validation HSM using data provided in a cryptogram transmission message. The system may be further configured to provide instructions for inserting into the cryptogram transmission message, information associated with a routing code to identify the validation HSM and a set of key identifiers as references to the first, second and SS master keys.

In some embodiments, the unique secret identifier may be generated by the OTP (contactless) card, and transmitted, via the cryptogram transmission message, to the validation HSM at run time. The validation HSM may then verify the unique secret identifier, using the SS master key, and validate the transaction cryptogram, thus obviating a need for network communication between the personalization and the validation HSMs, during a personalization phase of a contactless card.

Some embodiments of the present disclosure are directed to a non-transitory computer-readable medium comprising instructions for execution by a computer hardware arrangement, wherein upon execution of the instructions the computer hardware arrangement is configured to perform procedure comprising: distributing, via secure communication from an encryption service provider, a shared-secret master key to a personalization hardware security module (HSM) associated with a manufacturing entity and a validation HSM associated with a validating entity, wherein the manufacturing HSM and validation HSM are distinct and respectively store a first master key and a second master key, generating, by the personalization HSM, a unique secret identifier by encrypting a globally unique card identifier associated with a contactless card, with the shared-secret master key, storing the unique secret identifier in an embossing file on the contactless card during a personalization phase, wherein the embossing file further comprises the globally unique card identifier, a first unique key (UDK1) derived by encrypting the globally unique card identifier with the first master key (MK1), and a second unique key derived (UDK2) derived by encrypting the globally unique card identifier with the second master key (MK2), generating, by the contactless card, a transaction cryptogram comprising a message authentication code (MAC), the MAC being generated by encrypting the unique secret identifier with the first unique key and a transaction counter value generated at run time, transmitting, by the contactless card, a cryptogram transmission message to the validation HSM, the cryptogram transmission message comprising the transaction cryptogram, the unique secret identifier, the transaction counter value, and the globally unique card identifier, verifying, by the validation HSM, the unique secret identifier using the shared-secret master key, and validating, by the validation HSM, the MAC using the unique secret identifier, the first unique key and the transaction counter. The non-transitory computer-readable medium may further comprise instructions to insert, by the personalization HSM, information associated with a routing code to identify the validation HSM and a set of key identifiers as references to the first, second and third master keys.

BRIEF DESCRIPTION OF THE DRAWINGS

Various embodiments of the present disclosure, together with further objects and advantages, may best be understood by reference to the following description taken in conjunction with the accompanying drawings.

FIG. 1 illustrates a drawback with a conventional OTP card production cycle involving network exchange of embossing records during personalization phase of the OTP card.

DETAILED DESCRIPTION

Figure 2:
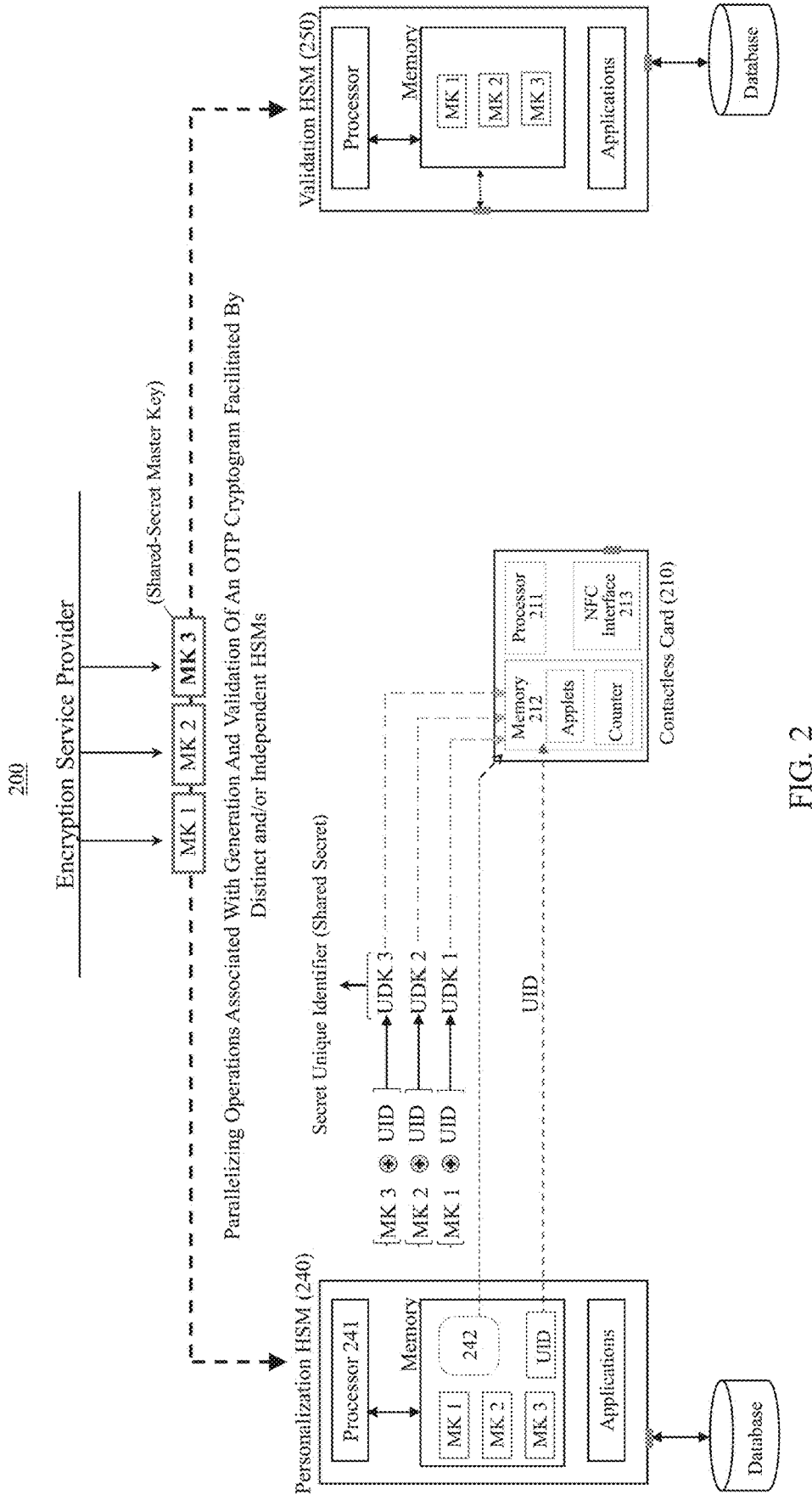
FIG. 2 illustrates an exemplary system implementation for parallelizing cryptographic operations at distinct personalization and validation HSMs, in accordance to some embodiments of the present disclosure.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

In some conventional cases, the operation cycle of a one-time password (authentication) card, corresponding to the run time generation and validation of an authentication transaction cryptogram, may be performed by distinct card personalization and validation entities. One drawback with such cases, involving for example a third-party remote OTP card validator, is the necessary network interactions between the OTP card manufacturing and personalization entity and the OTP card validator for enabling run-time validation of an a OTP authentication transaction (e.g., validation of a OTP transaction cryptogram). The aforementioned arrangement is illustrated in FIG. 1, which is prior art.

With reference to implementation 100 in FIG. 1, two master keys, corresponding for example to an authentication master key (MK1) and an encryption master key (MK2) are provided to both personalization HSM (120) and validation HSM (140). MK1 and MK2 may be used for the generation of a message authentication code (MAC) and the OTP transaction cryptogram, respectively. As shown in FIG. 1, card embossing records (150), such as a shared secret value, that may be used by the personalization HSM (120) to generate the MAC, shared with transmitted to the validation HSM during, for example, the OTP card personalization phase. The communication of such records may be required to enable run time validation of a OTP authentication cryptogram (e.g., OTP transaction cryptogram) by the validation entity. As described, such embossing records may be communicated in encrypted and/or clear form to a remote validation entity (e.g., validation HSM 140) during the personalization phase of an OTP card. However, as shown in FIG. 1, this arrangement poses security risks involving network exposure (e.g. unauthorized interception) of the transmitted (shared) embossing records. These and other deficiencies exit. Accordingly, there is a need for systems and methods that decouple the respective operations of distinct personalization and validations HSMs, to enable run time operation of an OTP authentication card without exposing critical encryption-related card embossing data.

One aspect of the present disclosure is directed at a novel encryption provision service that enables a third-party validation entity to independently carry out the decryption and validation of a transaction cryptogram associated with a (personalized) OTP authentication card, without network communication with the personalization/manufacturing entity. The proposed system and method provides a valuable utility from a security stand point, by obviating a need for network communication (for sharing of encryption-related data) during card personalization phase. Additional utility, provided by the proposed system and method, involves streamlining the out-sourcing of authentication/validation service for transaction processing involving OTP authentication cards.

FIG. 2 illustrates an exemplary system (200) for decoupling the decryption and validation process for an OTP transaction cryptogram (e.g., as performed by a validation HSM) from the card personalization process which facilitates the generation of the OTP transaction cryptogram. In accordance to some embodiment of the proposed solution, this may be accomplished by introduction of a distinct master key for the generation of a shared secret data. The shared-secret (SS) master key, distributed to both personalization and validation HSMs, di enables independent derivation of the (shared) secret value by the respective hardware security modules (HSM), thus enabling parallelized operations at distinct personalization and validation entities for facilitating secure OTP card transactions.

With reference to FIG. 2, the encryption service provider distributes, along with a first and a second master keys (MK1 and MK2 for MAC generation and encryption, respectively) an additional shared-secret master key (MK3) that may be used, by the personalization HSM (240) to generate a unique secret identifier (e.g., shared secret value) represented as UDK3 in example 200. The validation HSM (250) may be operative to generate a matching unique secret identifier using the previously stored shared-secret master key (MK3) to facilitate the OTP cryptogram validation process. In accordance to some embodiments, the personalization HSM (240) may generate a set of unique card keys (UDK 1, UDK 2, UDK 3) by encrypting a globally unique card identifier (UID) with each respective master key (e.g., MK1, MK2, MK3), as represented by the process (242) running, for example, on the personalization HSM (240). The personalization information comprising the unique card keys and the globally unique card identifier (UID) may then be stored onto the OTP card (e.g., onto the memory (212) integrated onto the contactless card (210)).

Figure 3:
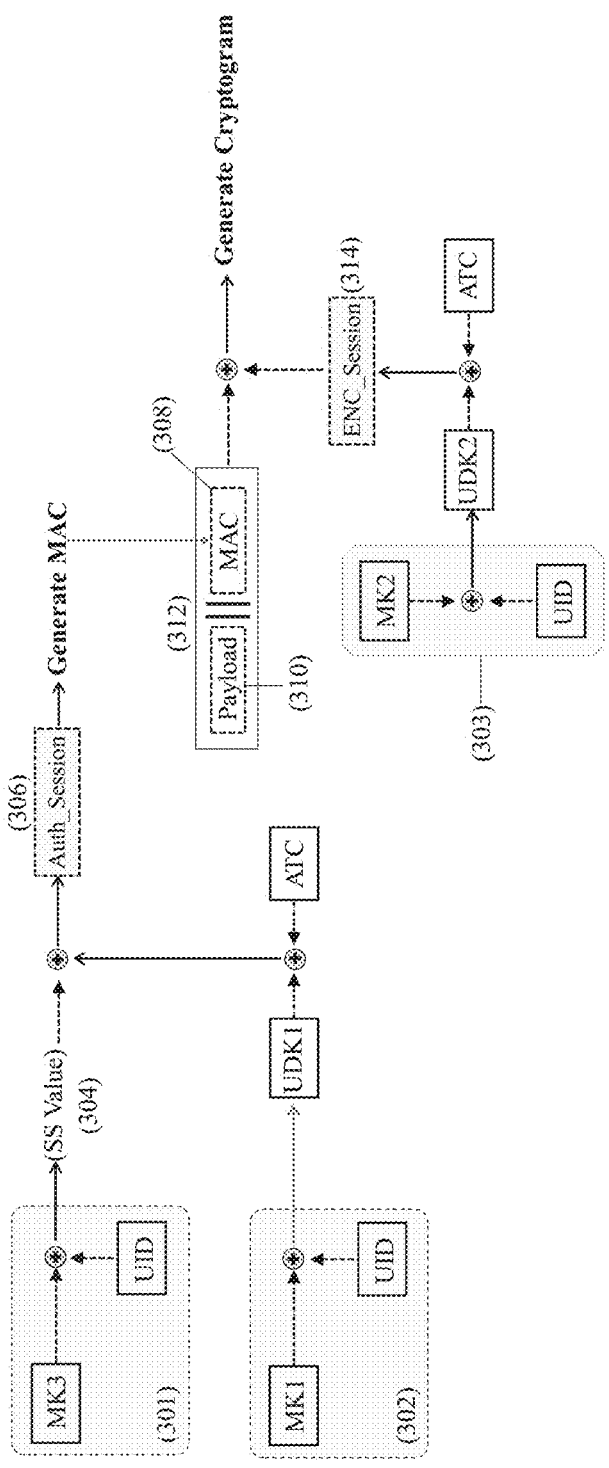
FIG. 3 illustrates an exemplary flow diagram of the OTP card cryptogram encryption and generation process associated with run time operation of an OTP authentication card, in accordance to some embodiments of the present disclosure.

In some embodiments, a validation entity may also store instructions build into the validation function on how to use the master keys to decrypt and validate an incoming cryptogram message generated by an OTP card (e.g., contactless card 210). In some embodiments, the OTP card may correspond to a uniquely configured contactless card (210) with an integrated processor (211) and a NFC tag (213) storing NFC transmittable user authentication data (readable, for example, by a mobile device with a reader component and running a corresponding application) The contactless card (210) may further comprise a counter, also referred to as application transaction counter (ATC), for keeping track of OTP transactions initiated by the contactless card, as well as one or more applets for facilitating the generation of the OTP authentication cryptogram. In some embodiments the transaction counter value may be updated for each OTP transaction initiated by the contactless card. An exemplary process flow (300) for generation of an encrypted authentication message (e.g. a OTP authentication cryptogram) by an OTP card is shown in FIG. 3.

As described above, with respect to some embodiments, a personalization HSM may generate a unique secret identifier (e.g., shared secret value) by encrypting the globally unique card identifier (UID), associated with an OTP card, with a shared secret (SS) master key, corresponding to the third master key (MK3) as shown in FIG. 2. The unique secret identifier may then be stored in an embossing file on the OTP card during the card personalization phase, wherein the embossing file may further comprises a first unique key, derived by encrypting the globally unique card identifier (UID) with the first master key (MK1), and a second unique key, derived by encrypting the globally unique card identifier (UID) with the second master key (MK2). In some embodiments the shared secret (SS) master key, corresponding to the third master key (MK3) may be distributed to the personalization and the validation HSMs as an encryption function.

In accordance to example 300, specific encryption inputs (e.g., SS value, UDK1, UDK2), required for generation of the transaction cryptogram, may be respectively generated by process 301 (corresponding to the generation of the unique secret identifier (304) by cryptographically combining MK3 with UID), process 302 (corresponding to the generation of the first unique card key (UDK1) by cryptographically combining MK1 with UID) and process 303 (corresponding to the generation of the second unique card key (UDK2) by cryptographically combining MK2 with UID). In accordance to some embodiments, processes 301, 302 and 303, may be performed by the personalization hardware security module (HSM) with only the output values (e.g., SS value 304, UDK1 and UDK2) written to the OTP card. In accordance to other embodiments the aforementioned processes may be executed on an OTP card at run-time (e.g., at initiation of a transaction using the OTP card). In such a scenario the corresponding master keys (MK1, MK2, and MK3) may be stored on an integrated memory of the OTP card and utilized accordingly by an applet stored on the OTP card to generate the card-specific encryption inputs (e.g., SS value, UDK1 and UDK2).

Referring back to the exemplary process flow 300, run-time generated data, such as the application transaction counter (ATC) value, may then be used to diversify UDK1 which is further cryptographically combined with the output of process 301 (e.g., shared secret value 304) to create an authentication session key (306). The authentication session key (306) is then used for generating the message authentication code (MAC). As further shown in the exemplary process flow 300, the generated MAC (308) may be appended to a payload message (310) to create a data packet (312). The resulting data packet (312) may then be encrypted by an encryption session key (314), generated at run time by diversifying the output of process 303 (e.g., UDK2) with the ATC value, to generate the OTP card (transaction) cryptogram.

Figure 4:
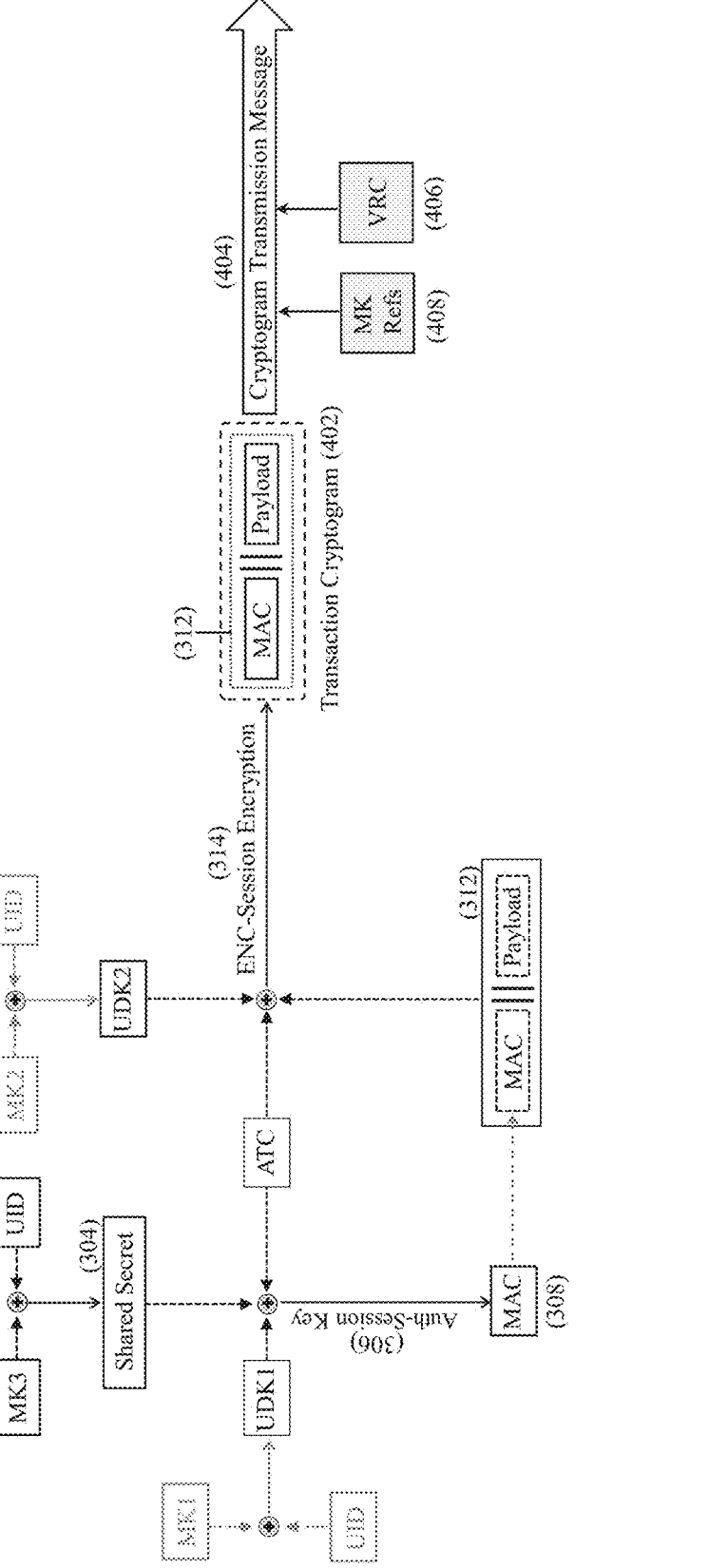
FIG. 4 illustrates an exemplary OTP card cryptogram and transmission message, in accordance to some embodiments of the present disclosure.

A cryptogram transmission message (404) comprising a transaction cryptogram (402) with multiple layers of encryptions, as shown in FIG. 4, may then be transmitted to a validation HSM at run time (e.g., upon initiation of a transaction using the OTP card). The exemplary transaction cryptogram (402), shown in FIG. 4, may comprise a data payload, and a MAC (generated by diversifying UDK1 with the ATC and the unique secret identifier (e.g., SS value 304). The unique secret identifier (interchangeably referred to as the SS value and/or UDK3) may be generated (by encrypting the UID with the SS master key) either by the personalization HSM during the OTP card personalization phase, or by the OTP card at run time. In accordance to some embodiment, the MAC may be independently derived and validated by a validation entity at run-time.

With respect to example 400 in FIG. 4, the transaction cryptogram (402) is generated at run-time using the information stored on the OTP card. Accordingly, the unique (derived) card keys UDK1 and UDK2 are derived by combining MK1 and MK2 with the UID and ATC values using one or more diversification algorithms. As shown in FIG. 4, ATC value may be used as a diversification parameter with the unique card keys (e.g., UDK1 and UDK2) at run-time (referenced as tap time for a contactless OTP card) to create the authentication session key (306), and the encryption session key (314). In some embodiments, diversification algorithm may be implemented by performing an exclusive OR (XOR) logical operation. The authentication session key (306) may then be used in generation of the MAC, while the encryption session key may be used to encrypt a concatenation of a payload and the MAC (e.g. data packet 312) to generate the transaction cryptogram (402). In some embodiments, the payload may correspond to a 8 byte random number and the shared secret value (304) may correspond to the most entropic four bytes associated with the encryption of the globally unique card identifier (UID) with MK3 (e.g., the output of process 301).

As such, in accordance to some embodiments, the generation of MAC may correspond to two rounds of encryption, once with the authentication session key (derived by scrambling and/or diversifying UDK1 with the ATC value and the shared secret value 304), and again with the encryption session key (derived by scrambling and/or diversifying UDK2 with the ATC value) which occurs after the MAC is concatenated with a payload.

As can be observed from the cryptogram transmission message (404), shown in FIG. 4, the shared (encryption-related) data values (e.g., data parameters that the validation entity must be in possession of in order to decrypt and authenticate an OTP transaction cryptogram) corresponds to data generated and/or provided at run-time such as the UID and ATC value. The required run-time generated data may then be transmitted to the validator along with the transaction cryptogram (402), in the cryptogram transmission message (404). In accordance to exemplary implementation of the disclosed system/method, one or more required data, which may not be provided at run-time, such as the SS value (304), may be independently derived by the validator using the stored master keys and the data received in the cryptogram transmission message (404) at turn-time. The validation process, associated with embodiments of the proposed solution, is further described with reference to FIGS. 5-7.

In accordance to the exemplary embodiment 400, the cryptogram transmission message (404), may further comprise information associated with a validator routing code (406) to identify a corresponding validation HSM.

In some embodiments, master key referencing information (408) (e.g., one or more key identifiers used in generation of the MAC and encryption of the MAC-appended payload), may be inserted into the cryptogram transmission message (404) along with the transaction cryptogram (402), and the validator routing code (406). The aforementioned configuration may correspond to enhanced HSM functionality whereby the master key derivation functionality may be built into the function for MAC validation.

Figure 5:
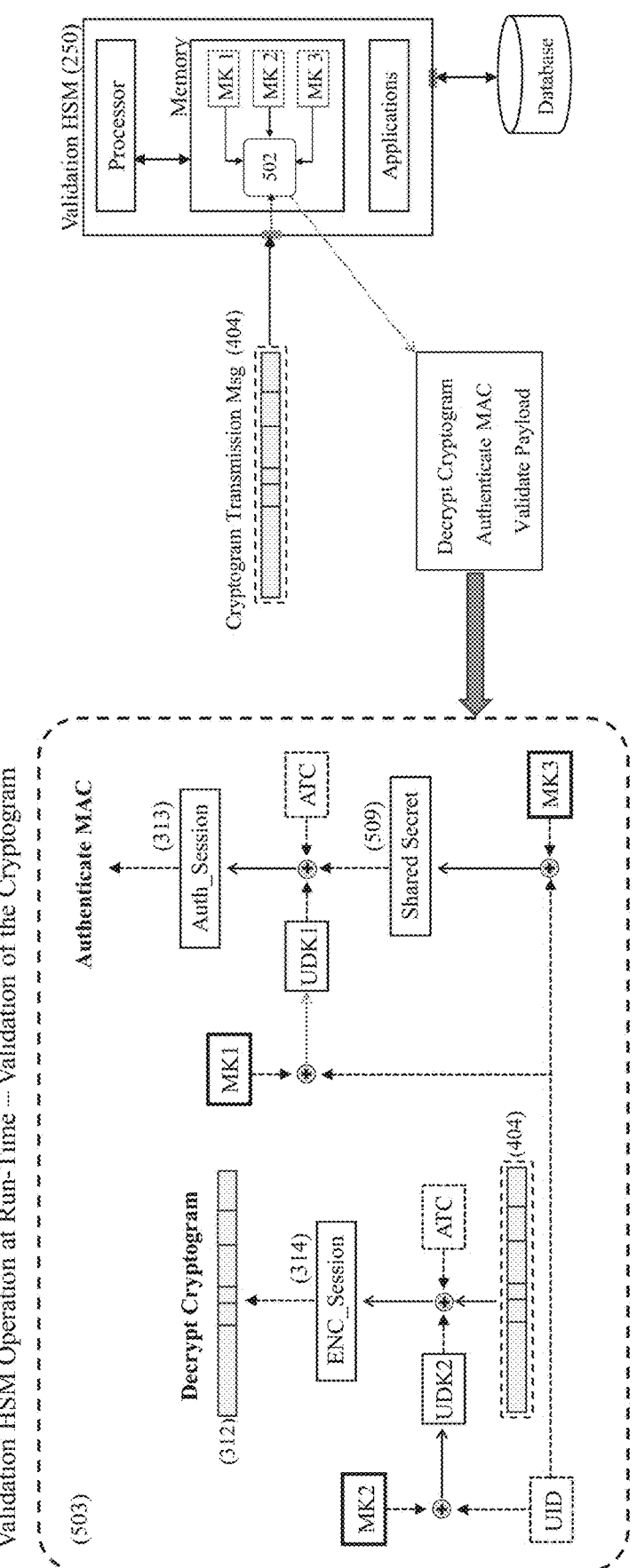
FIG. 5 illustrates an exemplary flow diagram of an exemplary OTP card cryptogram decryption and validation process, in accordance to some embodiments of the present disclosure.

FIG. 5 illustrated an exemplary run-time validation operations performed, for example, by the validation HSM (250). The run-time validation process, may be running on the validation entity as shown, for example, by process 502. Process 502 may utilize the stored master keys (MK1, MK2, MK3) to decrypt the transaction cryptogram (402), included in the cryptogram transmission message (404), and authenticate the MAC (308). An exemplary run-time process flow (503) associated with the validation process (502) is illustrated in FIG. 5. An incoming cryptogram transmission message (404) (e.g., as generated in accordance to FIGS. 3 and 4) may be processed, using the stored master keys (MK1, MK2 and MK3) in accordance to the process flow (503) to decrypt the transaction cryptogram (402), and authenticate the MAC.

The process flow diagram (503), illustrates an exemplary scheme of applying the stored master keys MK1, MK2 and MK3 in conjunction with the information transmitted in the OTP card cryptogram transmission message (404) (e.g., UID and most recent ATC value) to the derive the encryption session key (314) for decrypting the transaction cryptogram (402) and extracting a (pre-encrypted) MAC (e.g., having an additional layer of encryption associated with UDK1) from the decrypted data packet (312). The payload concatenated with the MAC (pre-encrypted with a first layer using UDK1) may also be extracted from the decrypted packet (505) and validated by the validation HSM (242). As shown by process flow (503), the encryption session key (504) may be generated, by the run-time validation process, by cryptographically combining the transmitted ATC value with UDK2 derived by encrypting the transmitted UID with the stored MK2 (e.g. stored on the validation HSM and/or a database communicatively coupled with the validation HSM)

A unique secret identifier (509) may then be independently derived by the validation HSM (250) by encrypting the UID with the SS master key (e.g., MK3), locally stored on the validation HSM, and verified against the unique secret identifier (304) provided in the cryptogram transmission message (404). Upon determining a match between the independently derived SS value (509) and the transmitted SS value (304), the unique secret identifier (e.g., SS value) may be used to derive the authentication session key (313) which is then used to decrypt and validate the MAC. The authentication session key (313) may be computed by the validation HSM (250) by cryptographically combining UDK1 and the shared secret value (509) with the run-time transmitted TC value, as shown by the process flow (503).

In some embodiments, the SS master key, distributed by a central encryption service provider, may be stored by the validation HSM, in conjunction with one or more mapping records for matching the globally unique card identifier (UID) with a corresponding user account. The UID may be provided to the validation HSM as part of the cryptogram transmission message generated by the OTP card.

Figure 6:
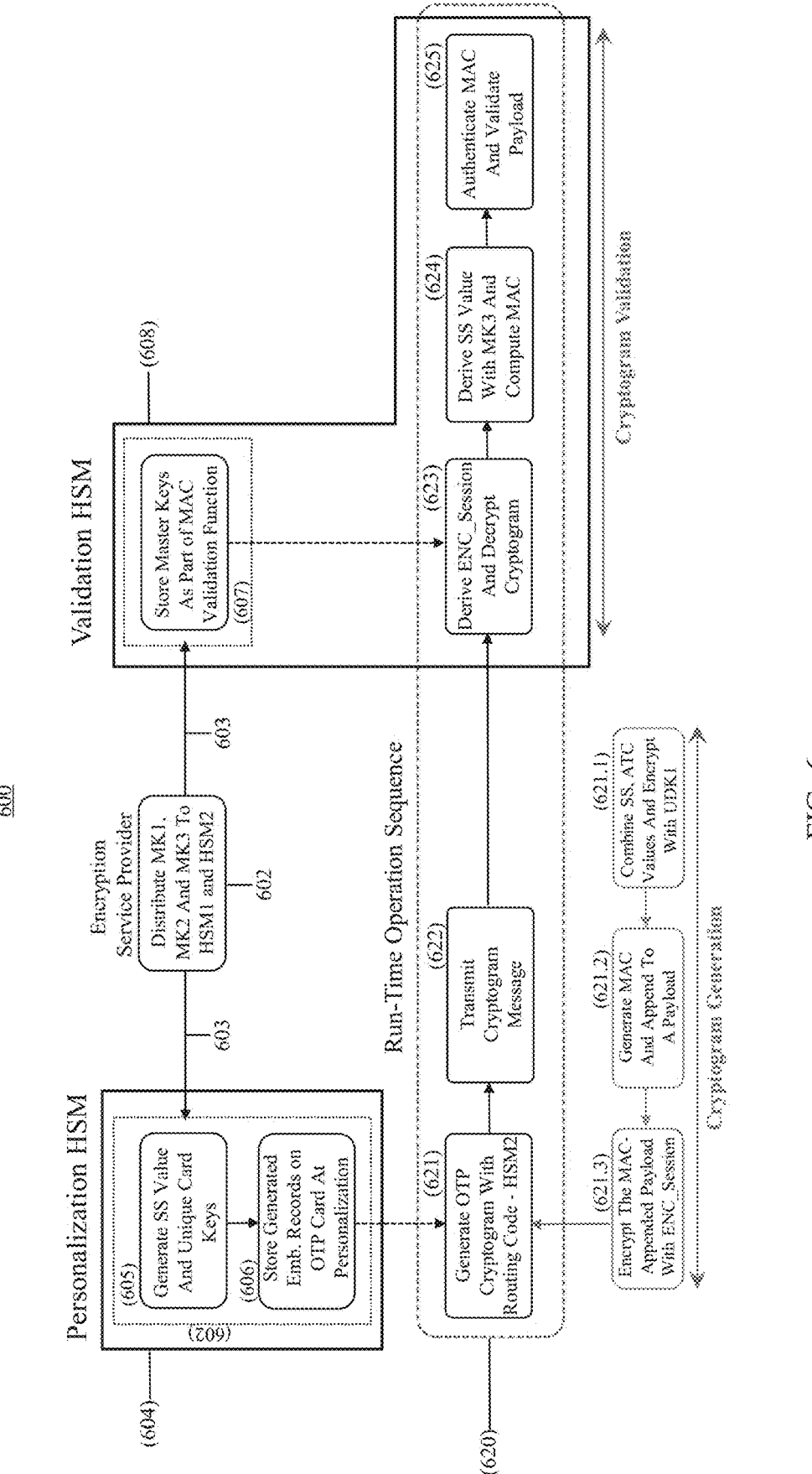
FIG. 6 provides a flow chart of the OTP card run-time operation sequence as enabled by parallelized process flow at distinct personalization and validation HSMs, in accordance to some embodiments of the present disclosure.

FIG. 6 illustrates a flow diagram (600) which provides an exemplary operational overview for parallelizing the operation flow (602) performed, by a personalization HSM (604), during a personalization phase of an OTP card (e.g., involving step 605 for derivation of the unique card keys (UDK1 and UDK2) and the shared secret value, and step 606 for storing the generated card embossing records onto the OTP card) and the operation flow (607), performed by a validation HSM during the personalization phase (602) of the OTP card. As shown in the flow diagram (600), operation flow 607 simply involves a step of storing the distributed master keys, including a shared-secret master key for independent derivation of the unique secret identifier, by the validation HSM. As shown by the flow diagram (600), step 607 may be performed (independently of) in parallel with the operation flow (602).

Referring back to FIG. 6, the exemplary process (600) may start with distribution of a set of cryptographic master keys, including a shared secret key for independent derivation of the shared secret value (e.g., unique secret identifier)

by the personalization and the validation HSM (HSM2). This is represented by data communication path 603 in flow diagram 600. The described parallelized scheme for implementing an OTP card encryption service (for example during the OTP card personalization phase) enables run-time validation process involving decryption and validation of an cryptogram message (steps (623)-(625)), to be performed by an independent validation HSM (608), using only run-time information transmitted in the cryptogram transmission message (e.g., as acquired through steps 621 and 622). Steps 621 and 622 representing the run-time operation of an OTP card (enabled, for example, by the personalization process flow) may correspond to the generation (621) and transmission (622) of the cryptogram transmission message.

With reference to FIG. 6, an OTP card personalization phase, as represented by steps 605 and 606, may involve the generation and storage of embossing records (e.g., shared secret value, UDK 1, UDK 2 and UID) onto an integrated memory of an OTP card. As shown by the flow diagram 600, the role of a validation entity, comprising storage of the master keys as part of a cryptogram validation function (step 607) may be implemented in parallel with the personalization phase to facilitate the sequence of run-time operations (620) comprising generation (621), transmission (622) and validation (623-625) of an OTP cryptogram message. In some embodiments, the OTP cryptogram message may further include a routing code for identifying the destination validation HSM (e.g., validation HSM 608)

The generation of the OTP transaction cryptogram, as shown in step 621, may comprise the generation of the secret unique identifier by cryptographic diversification of UDK1 with the ATC values and the shared secret identifier to derive a session authentication key (step 621.1), the generation of the MAC using the session authentication key and appending of the MAC to a payload (step 621.2), and the encryption of the MAC-appended payload with the session encryption key generated by a cryptographic diversification of the UID with UDK2 stored on the card (step 621.3). The diversification function may correspond to an exclusive OR (XOR) logical operation. In some embodiments, the payload may correspond to a randomly generated 8 byte number.

The run-time validation of an OTP cryptogram, as shown in exemplary flow diagram 600, may further comprise step 623 for deriving the encryption session key and decrypting the cryptogram, step 624 for deriving the shared secret value (e.g., unique secret identifier) for use with UDK1 for computing the MAC, and step 625 for authenticating the MAC and validating a payload associated with the OTP card transaction cryptogram. In some embodiments, instruction for decrypting and authenticating an incoming cryptogram using a set of referenced master keys may be integrated into a cryptogram validation process running on the validation HSM.

As shown in the operational flow diagram (600) in accordance to an exemplary embodiment of the present disclosure, no communication and/or network transmission may be required between distinct personalization and validation HSMs in order to enable the run-time operation sequence (620) associated with an OTP card transaction (e.g., generation/transmission, and validation of an authenticated cryptogram message).

Figure 7:
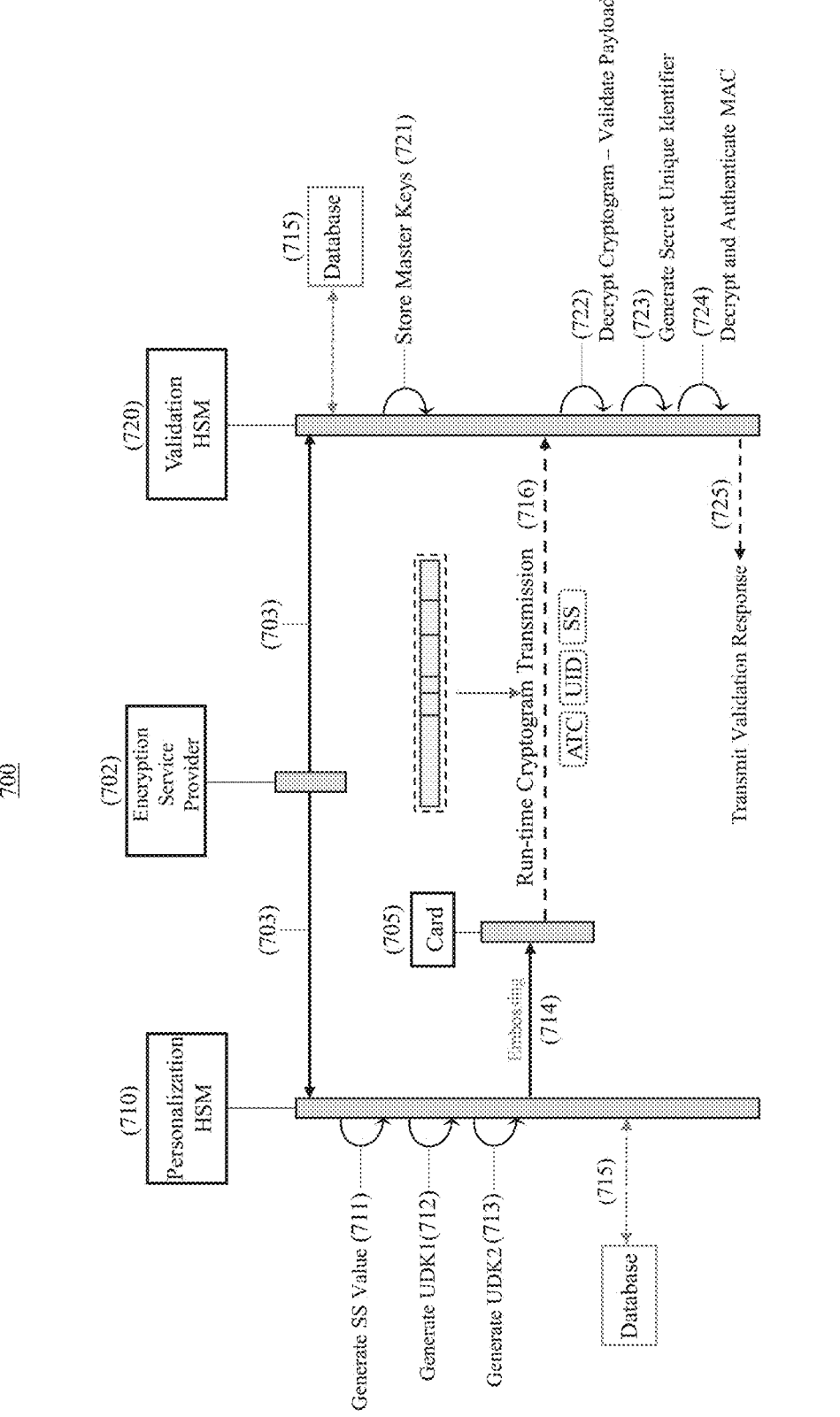
FIG. 7 illustrates a timing sequence diagram for parallelized and independent personalization and validation of an OTP card, in accordance to some embodiments of the present disclosure.

FIG. 7 illustrates an exemplary timing sequence diagram (700) for parallelizing the operation flow associated with the personalization and validation of a OTP card by distinct personalization and validation entities with no communication three-between. With reference to FIG. 7, the process may be initiated by an encryption service provider (702)

communicating a set of master cryptographic keys (703) to both the personalization HSM (710) and a validation HSM (720). As shown in exemplary illustration of FIG. 7, operations performed by the HSM (710) during the card personalization phase comprise the creation of embossing record corresponding to generation of a secret unique identifier (operation 711) using the shared-secret master key (e.g., MK3), and generation of the unique-derived card keys UDK1 and UDK2 (operations 712 and 713.) The created embossing records may then be written to an OTP card at operation step 714, to complete the personalization of the OTP card. The personalization process (depicted by operational steps 711-714) enable the OTP card to generate a unique enciphered authentication message (e.g., cryptogram transmission message) at run-time that may be validated and authenticated by a validation entity (720).

The generated embossing record written to the OTP card at step (714) may also be stored on the Personalization HSM (710) and/or a database (715) communicatively couple to the Personalization HSM (710).

According to the exemplary timing diagram (700), the operation flow conducted by the validation HSM may proceed independently of the operations carried out by the HSM (710) during the personalization phase of the OTP card. For example, following the distribution of master keys (703) by the encryption service provider (702), the validation entity (720) may proceed to store the received master keys (703), corresponding to operational step 721, for enabling a run-time cryptogram validation process involving the decryption, validation and authentication of an incoming cryptogram transmission message (716) that may be generated by the OTP card (705) at run-time (e.g., upon initiation of an OTP card transaction.)

As described above with respect to the exemplary timing sequence diagram (700), the personalization HSM may generate card embossing records (714) to be stored on the OTP card (705). The embossing records may comprise one or more globally unique card identifiers (UIDs) and a set of unique card keys UDK1 and UDK2 derived by encrypting the UID with the (first) Authentication master key and the (second) Encryption master key, distributed to both the Personalization HSM (710) and the Validation HSM (720), by the Encryption service provider (702). As further discussed above in accordance to some embodiment of the present disclosure, a third master key (MK3) may also be distributed to the Personalization and the Validation HSMs via communication 703. The third master key (MK3) may correspond to an encryption function for scrambling a globally unique card identifier (UID) to generate a secret unique identifier (shared secret value) that may be stored on the card and used at run-time to derive the authentication session key for generating a MAC, to be appended to a payload message.

The Validation HSM (720), using the stored master keys (e.g., step 721 that may be performed in parallel with the OTP card personalization steps 711-715) may, independently derive the shared secret value as part of a process to compute the authentication session key in order to decrypt and authenticate the MAC associate with the OTP transaction cryptogram, and validate the payload included in the cryptogram transmission message (716). The cryptogram transmission message (716) may be transmitted by the OTP card (705) at a particular time when the OTP card is actively used to facilitate an electronic authentication transaction.

Accordingly, as illustrated in the exemplary timing sequence (700), the decryption and validation of an incoming (authentication) cryptogram may be carried out by the validation HSM (720) using the commonly distributed master keys (stored in step 721) and the data included in the run-time OTP card cryptogram transmission message (716). In some embodiments the data may comprise the globally unique card identifier (UID) along with the Application Transaction Counter (ATC) value recorded by the OTP card. The recorded ATC value is then incremented for each subsequent OTP authentication transaction initiated by the contactless card In some embodiments, a validator routing code may be included in the cryptogram transmission message (716) in order to correctly identify a corresponding validation HSM (e.g., Validation HSM 720). Upon receiving the cryptogram transmission message (716), the validation entity may use a MAC validation function as part of the decryption process, using the stored master keys to decrypt, authenticate and validate the incoming transmission. With reference to the exemplary timing sequence diagram (700) illustrated in FIG. 7, the (run-time) validation process triggered upon receiving the cryptogram transmission message (716) may be represented by a series of operations corresponding to decryption of the received cryptogram transmission message to acquire the payload along with the encrypted MAC (corresponding to step 722), derivation of the unique secret identifier using the stored MK3 in combination with the UID (step 723), and subsequent decryption and authentication of the MAC (step 724). Upon successful validation of the cryptogram payload and authentication of the MAC, a validation response (725) may be transmitted back to a requesting party associated with the OTP card transaction.

In some embodiments, the encryption service provider may correspond to a central key processing device configured to generate and distribute the shared master key in addition to the authentication and encryption master keys, to a personalization and a validation entity.

Figure 8:
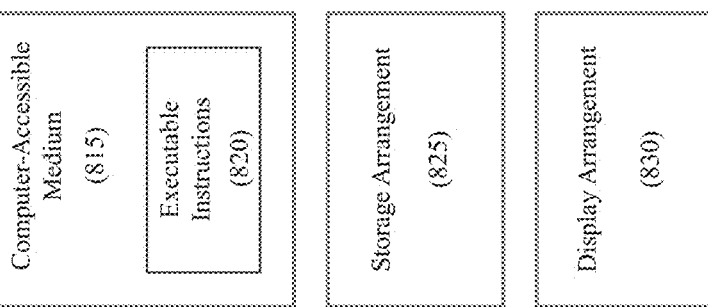
FIG. 8 is an illustration of an exemplary block diagram of an exemplary system, in accordance to some embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., a computer hardware arrangement) 805. Such processing and/or computing arrangement 805 can be, for example entirely or a part of, or include, but not limited to, a computer and/or processor 810 that can include, for example, one or more microprocessors, and use instructions stored on a computer-accessible medium (e.g., RAM, ROM, hard drive, or other storage device).

As shown in FIG. 8, for example a computer-accessible medium 815 (e.g., as described herein above, a storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute certain exemplary procedures, processes, and methods, as described herein above, for example.

Further, the exemplary processing arrangement 805 can be provided with or include an input/output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

Systems and methods described herein can provide secure, retrieval of sensitive user information or enabling streamlined communication and processing of sensitive user information for example, for facilitating secure electronic transactions. Once a valid authorization response from an authenticated user has been established, the automated data retrieval and transfer systems and processes can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions), and other transactions.

As used herein, personal identification information (PII) can include any sensitive data, including financial data (e.g., account information, account balances, account activity), personal information and/or personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for parallelizing generation and validation process of encrypted data associated with contactless authentication cards, the method comprising:

distributing, via secure communication from an encryption service provider, a shared-secret master key to a personalization hardware security module (HSM) associated with a manufacturing entity and a validation HSM associated with a validating entity, wherein the personalization HSM and validation HSM are distinct and respectively store a first master key and a second master key;

generating, by the personalization HSM, a unique secret identifier by encrypting a globally unique card identifier associated with a contactless card, with the shared-secret master key;

storing the unique secret identifier in an embossing file on the contactless card during a personalization phase, wherein the embossing file further comprises the globally unique card identifier, a first unique key (UDK1) derived by encrypting the globally unique card identifier with the first master key (MK1), and a second unique key derived (UDK2) derived by encrypting the globally unique card identifier with the second master key (MK2);

generating, by the contactless card, a transaction cryptogram comprising a message authentication code (MAC), the MAC being generated by encrypting the unique secret identifier with the first unique key and a transaction counter value generated at run time;

transmitting, by the contactless card, a cryptogram transmission message to the validation HSM, the cryptogram transmission message comprising the transaction cryptogram, the unique secret identifier, the transaction counter value, and the globally unique card identifier;

verifying, by the validation HSM, the unique secret identifier using the shared-secret master key; and validating, by the validation HSM, the MAC using the unique secret identifier, the first unique key and the transaction counter value.

2. The method of claim 1, wherein the transaction counter value is updated for each authentication transaction initiated by the contactless card.

3. The method of claim 1, wherein the cryptogram transmission message is transmitted to the validation HSM upon initiation of an authentication transaction using the contactless card.

4. The method of claim 3, wherein the cryptogram transmission message further comprise information associated with a routing code to identify the validation HSM, and a set of key identifiers as references to the first, the second and the shared-secret master keys.

5. The method of claim 1, wherein the shared-secret master key is distributed to the personalization and the validation HSMs as an encryption function.

6. The method of claim 1, wherein the first unique key is used, by the personalization HSM for generation of the MAC using the unique secret identifier and the transaction counter value, and the second unique key is used with the transaction counter value for encrypting a transmission payload concatenated with the MAC to generate the transaction cryptogram.

7. The method of claim 1, wherein the MAC is generated by combining the first unique key, the unique secret identifier and the transaction counter value, using a diversification function.

8. The method of claim 7, wherein the diversification function corresponds to an exclusive OR (XOR) logical operation.

9. The method of claim 1, wherein the shared-secret master key is stored onto the contactless card and used, by an applet running on the contactless card, to derive the unique secret identifier at run time.

10. The method of claim 1, wherein the shared-secret master key, distributed by the encryption service provider, is stored by the validation entity, in conjunction with one or more mapping records for matching the globally unique card identifier with a corresponding user account.

11. The method of claim 10, wherein the globally unique card identifier is derived by the validation HSM by decrypting the unique secret identifier with the shared-secret master key, wherein the unique secret identifier is provided in the cryptogram transmission message.

12. The method of claim 11, wherein the unique secret identifier is derived by the validation HSM, by encrypting the globally unique card identifier with the shared-secret master key stored on the validation HSM, wherein the globally unique card identifier is provided in the cryptogram transmission message.

13. The method of claim 1, further comprising, transmitting, by a validation server associated with the validation entity, a MAC validation response message.

14. A non-transitory computer-readable medium comprising instructions for execution by a computer hardware arrangement, wherein upon execution of the instructions the computer hardware arrangement is configured to perform procedure comprising:

distributing, via secure communication from an encryption service provider, a shared-secret master key to a personalization hardware security module (HSM) associated with a manufacturing entity and a validation HSM associated with a validating entity, wherein the manufacturing HSM and validation HSM are distinct and respectively store a first master key and a second master key;

generating, by the personalization HSM, a unique secret identifier by encrypting a globally unique card identifier associated with a contactless card, with the shared-secret master key;

storing the unique secret identifier in an embossing file on the contactless card during a personalization phase, wherein the embossing file further comprises the globally unique card identifier, a first unique key derived by encrypting the globally unique card identifier with the first master key, and a second unique key derived by encrypting the globally unique card identifier with the second master key;

generating, by the contactless card, a transaction cryptogram comprising a message authentication code (MAC), the MAC being generated by encrypting the unique secret identifier with the first unique key and a transaction counter value generated at run time;

transmitting, by the contactless card, a cryptogram transmission message to the validation HSM, the cryptogram transmission message comprising the transaction cryptogram, the unique secret identifier, the transaction counter value, and the globally unique card identifier;

verifying, by the validation HSM, the unique secret identifier using the shared-secret master key; and validating, by the validation HSM, the MAC using the unique secret identifier, the first unique key and the transaction counter value.

15. The non-transitory computer-readable medium of claim 14, further comprising instructions to increment the transaction counter value at each authentication transaction facilitated by the contactless card.

16. The non-transitory computer-readable medium of claim 14, further comprising instruction to insert, by the personalization HSM, information associated with a routing code and a set of key identifiers, into the contactless card, wherein the routing code identifies the validation HSM and the set of key identifiers identify the first master key, the second master key and the shared-secret master key.

17. A system for secure provision of encryption service for contactless card transactions, comprising a computer hardware arrangement; and a contactless card, wherein the computer hardware arrangement is configured to:

distribute, via secure communication from an encryption service provider, a shared-secret master key to a personalization hardware security module (HSM) associated with a manufacturing entity and a validation HSM associated with a validating entity, wherein the manufacturing HSM and validation HSM are distinct and respectively store a first master key and a second master key, generate, by the personalization HSM, a unique secret identifier by encrypting a globally unique card identifier associated with a contactless card, with the shared-secret master key, and storing the unique secret identifier in an embossing file on the contactless card during a personalization phase, wherein the embossing file further comprises the globally unique card identifier, a first unique key derived by encrypting the globally unique card identifier with the first master key, and a second unique key derived by encrypting the globally unique card identifier with the second master key;

wherein the contactless card is configured to:

generate a transaction cryptogram comprising a message authentication code (MAC), the MAC being generated by encrypting the unique secret identifier with the first unique key and a transaction counter value generated at run time, and transmit a cryptogram transmission message to the validation HSM, the cryptogram transmission message comprising the transaction cryptogram, the unique secret identifier, the transaction counter value, and the globally unique card identifier; and wherein the computer hardware arrangement is further configured to:

verify, by the validation HSM, the unique secret identifier using the shared- secret master key, and validate, by the validation HSM, the MAC using the unique secret identifier, the first unique key and the transaction counter value.

18. The system of claim 17, wherein the shared-secret master key is distributed to the personalization and the validation HSMs as an encryption function.

19. The system of claim 17, wherein the first unique key is used, by the personalization HSM for generation of the MAC using the unique secret identifier and the transaction counter value, and the second unique key is used with the transaction counter value for encrypting a transmission payload concatenated with the MAC to generate the transaction cryptogram.

20. The system of claim 17, wherein the MAC is generated by combining the first unique key, the unique secret identifier and the transaction counter value, using a diversification function.

* * * * *